May 1, 1945.　　　　A. L. SKLAR　　　　2,375,142
WAX PRODUCTION
Filed Oct. 2, 1942
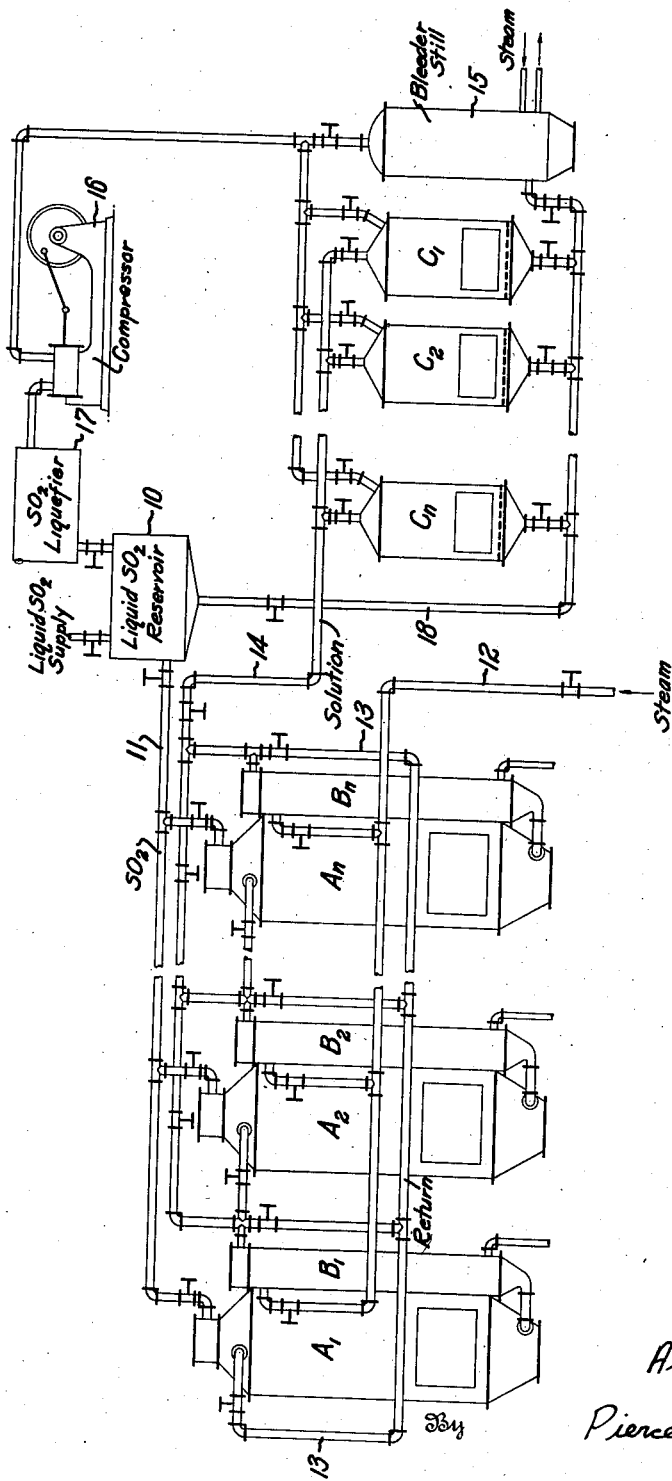
Inventor:
Alfred Lee Sklar
By Pierce & Scheffler
Attorneys.

Patented May 1, 1945

2,375,142

UNITED STATES PATENT OFFICE 2,375,142

WAX PRODUCTION

Alfred Lee Sklar, Washington, D. C.

Application October 2, 1942, Serial No. 460,538

6 Claims. (Cl. 260—412.8)

This invention relates to the production of wax and is particularly directed to an improved method for the efficient and economical separation of a useful wax from sugar cane.

It has long been known that sugar cane contains a waxy substance, largely localized upon the outer rind of the cane, and a number of proposals have been made for isolating this wax, which is commonly known as "sugar cane wax." It has been found that a substantial proportion of the wax content of the sugar cane is carried along with the juice obtained in the usual crushing and expressing operations, and that this wax is eventually found in the filter cake resulting from the defecating and clarifying operations and known in the industry as "mud."

I have now found that the sugar cane wax can be very efficiently separated from materials containing the same, such as the filter cake or mud obtained in the defecation of the cane juice, by extracting the materials with liquid sulfur dioxide.

The extraction is preferably carried out under pressure at a temperature above normal. The wax is obtained in solid form from the extracting liquid by evaporating off the sulfur dioxide or preferably by cooling the extracting liquid and decanting or filtering the liquid portion from the wax which separates out on cooling.

In order to provide an economical extraction of substantially the entire wax content of the material, it is advantageous to subject the material to a series of extractions on the countercurrent principle beginning the treatment of fresh material with liquid sulfur dioxide which is already nearly saturated with wax by contact with previously extracted material and finally treating the nearly exhausted material with fresh liquid sulfur dioxide.

The number of extractions necessary and the relative volumes of liquid sulfur dioxide required will largely depend on the temperature at which extractions are carried out which will be governed by the pressure which the available apparatus will stand.

An illustrative method of operation embodying the principles of the invention will be more particularly described with reference to the accompanying drawing which is a diagrammatic representation of apparatus suitable for practicing the invention.

In the drawing $A_1$, $A_2$—$A_n$ are a plurality of extractors having external heaters $B_1$, $B_2$—$B_n$ and fitted with suitable pipe interconnections and valves so that liquid can be passed in series through any desired set of the extractors similar to the well-known arrangement of diffuser batteries for the extraction of sugar values from sugar beets. The extractors are fitted with a false bottom for supporting the wax-containing material to be extracted.

Liquid sulfur dioxide may be supplied to any of the extractors from reservoir 10 through pipe 11. Steam is supplied to the heaters through pipe 12. Liquid may be passed from any selector extractor through any selected group of the remaining extractors. Return pipe 13 and the individual feed pipes connecting pipe 13 with the extractors make it possible to start or end the extraction cycle at any of the extractors, and by means of pipe 14 liquid may be transferred from any of the extractors to any of the crystallizers $C_1$, $C_2$—$C_n$, which need not correspond in number with the number of extractors. In normal operation one of the extractors is being unloaded and reloaded with a fresh charge of wax-containing material while the material in the other extractors is undergoing the counter-current extraction.

The sulfur dioxide recovery system includes a still 15, a compressor 16 and a condenser 17.

In the operation of the apparatus, a charge of dry wax-containing material, such as the "mud" described above, is placed in one of the extractors in place of an exhausted charge, nearly saturated liquid from the extractor with the most recently charged material is then passed into the freshly charged extractor, and so on, in series, while a fresh batch of liquid sulfur dioxide is fed from the reservoir into the extractor containing the most nearly exhausted charge. The contents of the reactors are maintained at a suitable temperature, for example, about 75° C., by adjusting the steam supply to the external heaters. The liquid coming from the last charged extractor, now substantially saturated with wax, is now passed to one of the crystallizers $C_1$, $C_2$—$C_n$, and a new extraction cycle is started.

The solution in the crystallizer is cooled to approximately −10° C. by pumping off sulfur dioxide vapor through compressor 16 and condenser 17 until the pressure in the crystallizer is approximately atmospheric. Due to the cooling, the major portion of the wax content of the solution crystallizes out. The liquid remaining in the crystallizer is then drawn off through pipe 18 to the liquid sulfur dioxide reservoir.

In order to avoid an undue accumulation of impurities in the liquid sulfur dioxide, a portion of the liquid from the crystallizers is continuously or intermittently fed to still 15 where it is vaporized and the vapors returned to the system through compressor 16 and condenser 17.

The material remaining in the crystallizers after withdrawal of the mother liquor is a light-colored, fluffy material which readily decomposes on heating to form a brownish wax, typically having a melting point of 75° C., an iodine number of 36 and a saponification number of 116. This wax is very hard and is capable of producing a brilliant gloss. A typical dry sugar cane "mud" will yield about 10% by weight of the wax.

I claim:

1. A method of producing sugar cane wax which comprises extracting material containing sugar cane wax with liquid sulfur dioxide to produce a solution of the wax in liquid sulfur dioxide, separating the solution from the extracted material, and thereafter separating the wax from the solution.

2. A method of producing sugar cane wax which comprises extracting material containing sugar cane wax with liquid sulfur dioxide at a temperature substantially above normal to produce a solution of the wax in liquid sulfur dioxide, separating the solution from the extracted material, and thereafter separating the wax from the solution.

3. A method of producing sugar cane wax which comprises extracting material containing sugar cane wax with liquid sulfur dioxide at a temperature substantially above normal to produce a solution of the wax in liquid sulfur dioxide, separating the solution from the extracted material, and thereafter separating the wax from the solution by cooling the solution.

4. A method of producing sugar cane wax which comprises extracting material containing sugar cane wax with liquid sulfur dioxide at a temperature substantially above normal to produce a solution of the wax in liquid sulfur dioxide, separating the solution from the extracted material, and thereafter cooling the solution by partial evaporation of the sulfur dioxide and separating the residual liquid from the solid material formed on cooling.

5. A method of producing sugar cane wax which comprises extracting sugar cane mud with liquid sulfur dioxide at a temperature substantially above normal, separating the solution of wax thereby obtained from the residual mud, and thereafter separating the wax from the solution.

6. A method of producing sugar cane wax which comprises passing a series of batches of liquid sulfur dioxide successively into contact with a series of batches of sugar cane mud of progressively increasing wax content at a temperature substantially above normal until the liquid sulfur dioxide is substantially saturated with wax and the mud is substantially free of wax, and separating the wax from the solution.

ALFRED LEE SKLAR.